United States Patent [19]
Tumlin et al.

[11] Patent Number: 6,160,698
[45] Date of Patent: Dec. 12, 2000

[54] FASTENERS FOR ELECTRIC LOAD CENTER BASEPAN

[75] Inventors: Ricky W. Tumlin, Acworth; J. Larry Underwood, Woodstock, both of Ga.

[73] Assignee: L. L. Culmat, Ltd., Woodstock, Ga.

[21] Appl. No.: 09/316,812

[22] Filed: May 21, 1999

Related U.S. Application Data

[60] Provisional application No. 60/113,427, Dec. 23, 1998.

[51] Int. Cl.[7] ......................................................... H02B 1/01
[52] U.S. Cl. ........................ 361/627; 174/149 B; 361/637
[58] Field of Search ......................... 174/149 B; 361/611, 361/624, 626–627, 634, 636–640, 644, 648, 652, 673

[56] References Cited

U.S. PATENT DOCUMENTS

| | | |
|---|---|---|
| 3,769,553 | 10/1973 | Coley . |
| 4,118,754 | 10/1978 | Duggan .................................... 361/637 |
| 4,536,823 | 8/1985 | Ingram et al. ........................... 361/637 |
| 4,667,269 | 5/1987 | Morby et al. ............................ 361/638 |
| 4,931,898 | 6/1990 | Cole . |
| 5,134,543 | 7/1992 | Sharp et al. . |
| 5,272,592 | 12/1993 | Harris et al. ............................. 361/637 |
| 5,341,273 | 8/1994 | Sharp et al. . |
| 5,420,749 | 5/1995 | Gehrs et al. . |
| 5,450,282 | 9/1995 | Webber et al. . |
| 5,519,175 | 5/1996 | Cole . |
| 5,640,294 | 6/1997 | Caggiano et al. ....................... 361/637 |
| 5,786,982 | 7/1998 | Rose et al. . |

*Primary Examiner*—Gregory Thompson
*Attorney, Agent, or Firm*—Locke Reynolds LLP

[57] ABSTRACT

A first surface of a basepan of molded plastic for an electric load center includes a plurality of integrally formed fasteners for securing electrical components such as bus bars, neutral bars, and neutral tie bars to the basepan. Each fastener is formed in the absence of any core through the basepan from a second surface obverse to the first. Each integrally formed fastener has a support portion which projects away from the basepan first surface and a flexural portion supported by the support portion. The flexural portion has a first outwardly facing surface inclined with respect to the basepan first surface at an angle that facilitates elastic deformation of the flexural portion, but not the support portion upon application of a bar to the basepan. The flexural portion also has a second inwardly facing surface arranged at an angle with respect to the basepan first surface that facilitates fixed retention of the bar despite any reasonable variation in the thickness of the bar.

19 Claims, 4 Drawing Sheets

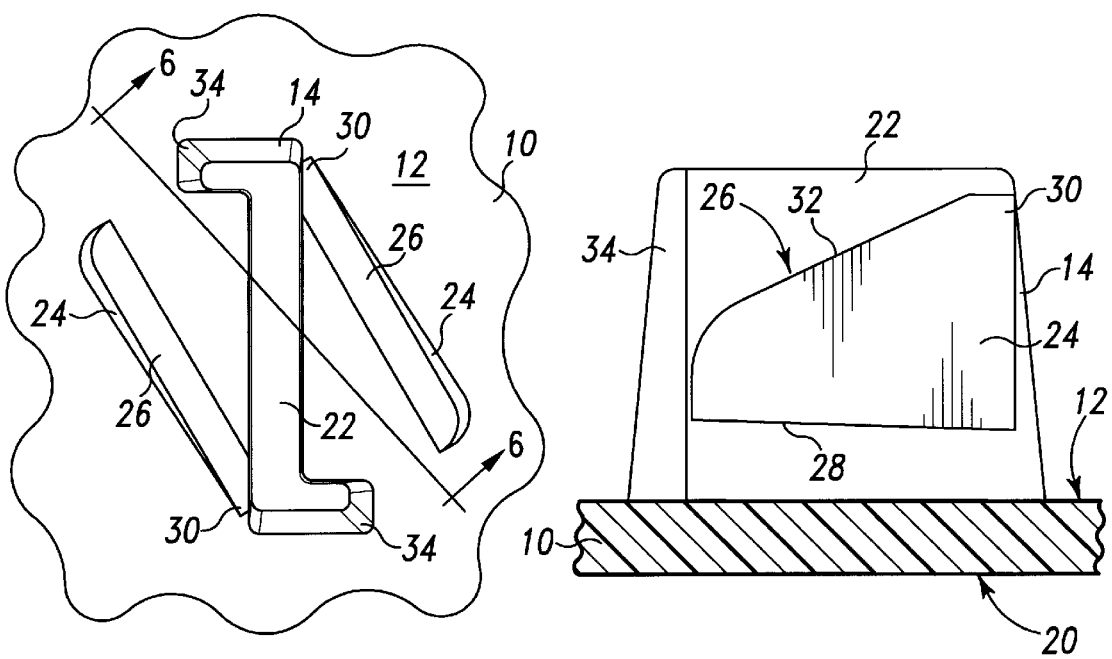
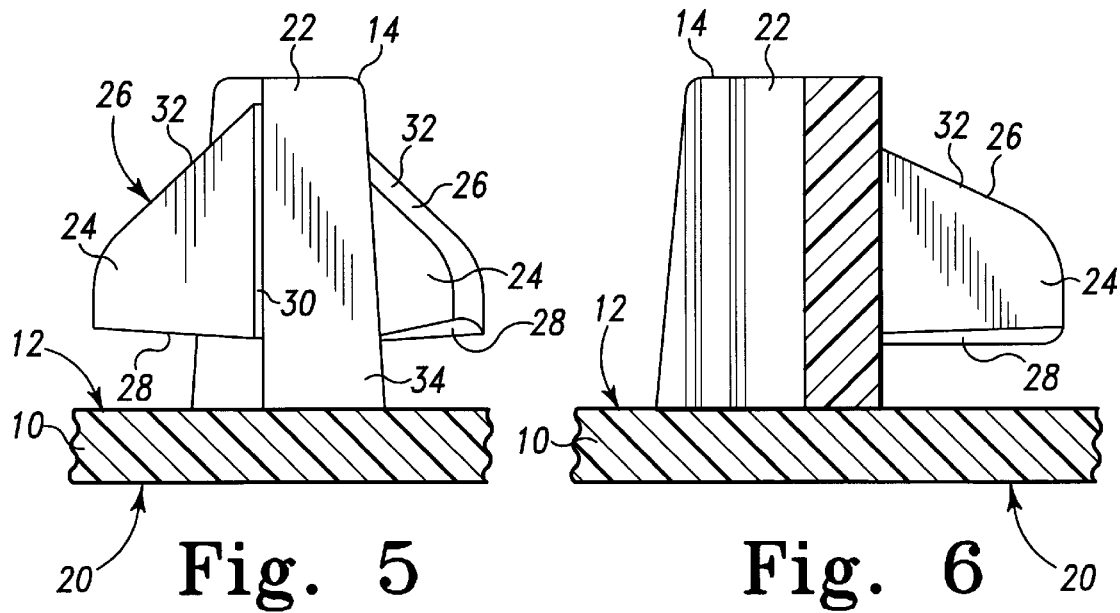

FASTENERS FOR ELECTRIC LOAD CENTER BASEPAN

CROSS REFERENCE TO RELATED APPLICATION

This application is related to U.S. provisional application 60/113,427 filed Dec. 23, 1998.

FIELD OF THE INVENTION

The present invention relates generally to molded basepans for electric load centers and, more particularly, to fasteners for mounting bus bars and other electrical components to the basepan.

BACKGROUND OF THE INVENTION

Electric load centers are employed to divide incoming electric power from a utility power line into a plurality of circuits, each circuit being controlled by a current monitoring circuit breaker. The electric load center generally consists of an insulated basepan on which several bus bars, neutral bars, neutral tie bars and other electrical components have been secured. The electrical components and basepan are generally enclosed within a protective enclosure. Representative basepans of the prior art are shown, for example, in U.S. Pat. Nos. 4,118,754; 4,536,823; 4,931,898; 5,450,282; 5,696,664 and 5,786,982.

Bus bars, neutral bars, and neutral tie bars have typically been secured to the basepan by common fastening devices such as screws, bolts, and separate snap-in fasteners which consume time to apply and require an inventory of extra parts to achieve assembly of the bar to the basepan. To eliminate the use of such extra parts, prior art has also employed posts which are integral parts of a plastic basepan which are intended to be plastically deformed by the application of ultrasonic or heat energy to deform the post to secure the bars to the basepan. The plastic deformation, often referred to as "heat staking", eliminates the need for separate fasteners, but requires the use of a significant amount of energy during the assembly process to heat the staking posts to the point of plastic deformation. Additionally, such heat staking requires some time to deliver the heat to the plastic to achieve the desired amount of deformation necessary to secure the bar to the basepan, which limits the speed at which assembly can be achieved.

An object of the present invention is to provide an electric load center basepan to which bus bars, neutral bars, neutral tie bars and similar electrical components can be secured without the use of separate or extra parts. It is also an object of the present invention to provide a basepan to which the various bars can be secured quickly and without the aid of devices consuming significant amounts of energy to make the assembly process quicker and lower cost. It is a further object of the present invention to permit the use of bars of the varying thickness to be secured to a common basepan.

SUMMARY OF THE INVENTION

In accordance with the present invention, a basepan of molded plastic for an electric load center comprises a first surface upon which electrical components such as bus bars, neutral bars, and neutral tie bars are to be mounted. The first surface includes a plurality of integrally formed fasteners, each fastener intended to engage at least one of the electrical bars to fix the bar to the basepan first surface. Each fastener is formed in the absence of any core through the basepan from a second surface obverse to the first. Each integrally formed fastener has a support portion which projects away from the basepan first surface and a flexural portion supported by the support portion. The flexural portion has a first outwardly facing surface inclined with respect to the basepan first surface at an angle that facilitates elastic deformation of the flexural portion, but not the support portion upon application of a bar to the basepan. The flexural portion also has a second inwardly facing surface arranged at an angle with respect to the basepan first surface that facilitates fixed retention of the bar despite any reasonable variation in the thickness of the bar.

In some embodiments, the flexural portion includes an upper margin integral with the support portion with the first outwardly facing surface dependent from the upper margin. In other embodiments of the invention, the flexural portion includes a lateral margin integral with the support portion with the first outwardly facing surface being situated on the upper edge of the flexural portion. The support portion can include outer edges sized to longitudinally and/or laterally locate the electrical component with respect to the basepan.

One feature of a basepan including the integral fasteners of the present invention is the absence of any core through the basepan from a back surface thereof. The absence of this core through structure insures electrical isolation from any structure facing the basepan back surface and assures greater structural integrity for the supporting portion of the fastener. Integral fasteners created with the aid of a core through structure, such as that disclosed in FIG. 5 of U.S. Pat. No. 4,118,754, also fail to provide any means for longitudinally and/or laterally locating the electrical component with respect to the basepan, thus allowing the electrical component to move with respect to the basepan.

Another feature of a basepan including the integral fasteners of the present invention is the variation of dimensions which can be provided to the second downwardly facing surface of the flexural portion thereby providing for fixed retention of various electrical components to the basepan surface despite variations in thickness of the electrical components. Yet another feature of the present invention is the integral nature of the fasteners themselves which eliminates any need for inventories of separate parts to achieve the assembly of the electrical components to the basepan. Still another feature of the present invention is the elastic deformability of the flexural portion separate from the support portion that allows assembly to occur in the absence of heat or ultrasonic energy for permanent deformation, thereby achieving faster and lower cost assembly of an electric load center.

These and other features and advantages will become apparent from a review of the following description of the embodiments shown in the accompanying figures that illustrate the best mode of the invention.

BRIEF DESCRIPTION OF THE DRAWINGS

FIG. 3 is an elevational detail view of one type of fastener in accordance with the present invention.

FIG. 4 is a side elevation view of the fastener shown in FIG. 3 as viewed from the lower left of FIG. 3.

FIG. 5 is side elevation view of the fastener shown in FIG. 3 as viewed from the bottom of FIG. 3.

FIG. 6 is a sectional view of the fastener shown in FIG. 3 as viewed from section line 6—6.

DESCRIPTION OF THE PREFERRED EMBODIMENTS

Figure 1:
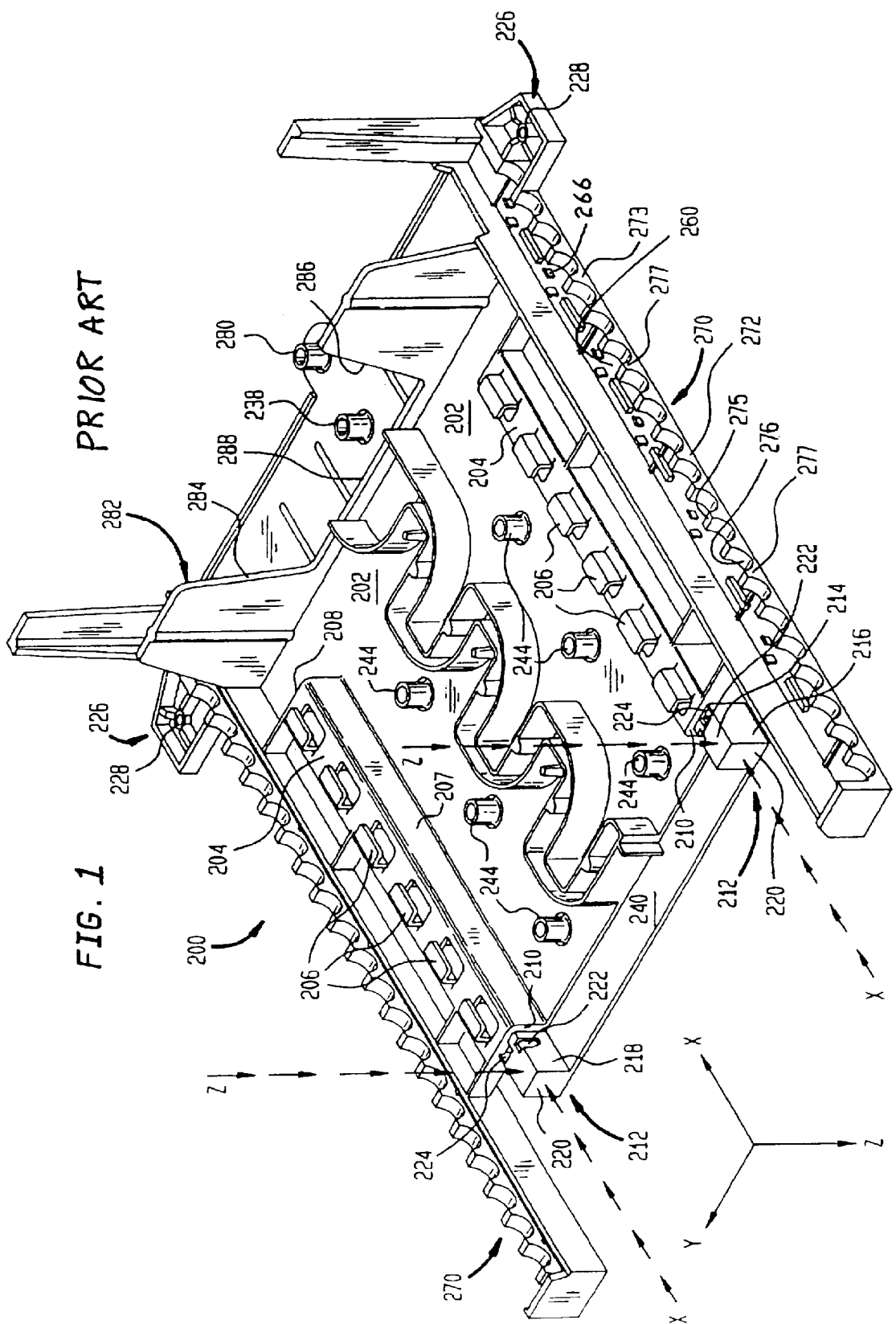
FIG. 1 shows the prior art as illustrated in FIG. 7 of U.S. Pat. Nos. 5,696,664 and 5,786,982.

A prior art basepan 200 is illustrated in FIG. 1. The basepan 200, as well as the basepans of the present invention, are preferably made out of an electrically insulated, thermo-plastic material that can be injection molded to include the desired structural features. One example of such a material is a polyphenylene oxide-based resin material sold under the trademark NORYL® sold by General Electric Co. The basepan 200 includes a first surface 202 upon which bus bars (not shown) can be mounted to distribute electric power from an incoming utility power line to a plurality of individual circuits through circuit breakers (not shown) supported on circuit breaker support rails 204 and engaged by circuit breaker support hooks 206. Each of the circuit breakers support rails 204 has an upper end wall 208 and a lower end wall 210. The basepan 200 includes a double walled serpentine electrically insulative barrier 250 shown to comprise walls 252 and 254 integrally formed with and extending substantially orthogonally upwards from the planar surface 202 of the basepan 200. The serpentine electrically insulative barrier is positioned on the basepan 200 to provide a continuous double wall physical barrier between a pair of bus bars (not shown) which are fixed to the surface 202 of the basepan 200. The bus bars are secured to the basepan in the prior art by integrally formed posts 242 and 244 which are especially adapted for heat staking as described more fully in U.S. Pat. No. 5,696,664, which description is hereby incorporated by reference. Neutral bars (not shown) are secured within channels 260 of basepan 200 by means of upwardly extending flexible snap hooks 264 and 266 that engage interior ridges present on the neutral bars. The snap hooks comprise simply an upwardly extending support portion having a hook on a distal end thereof, the support portion being dimensioned to be sufficiently flexible to permit deformation thereof so that the hook can engage the interior ridge of the neutral bar as described more fully in U.S. Pat. No. 5,696,664.

Figure 2:
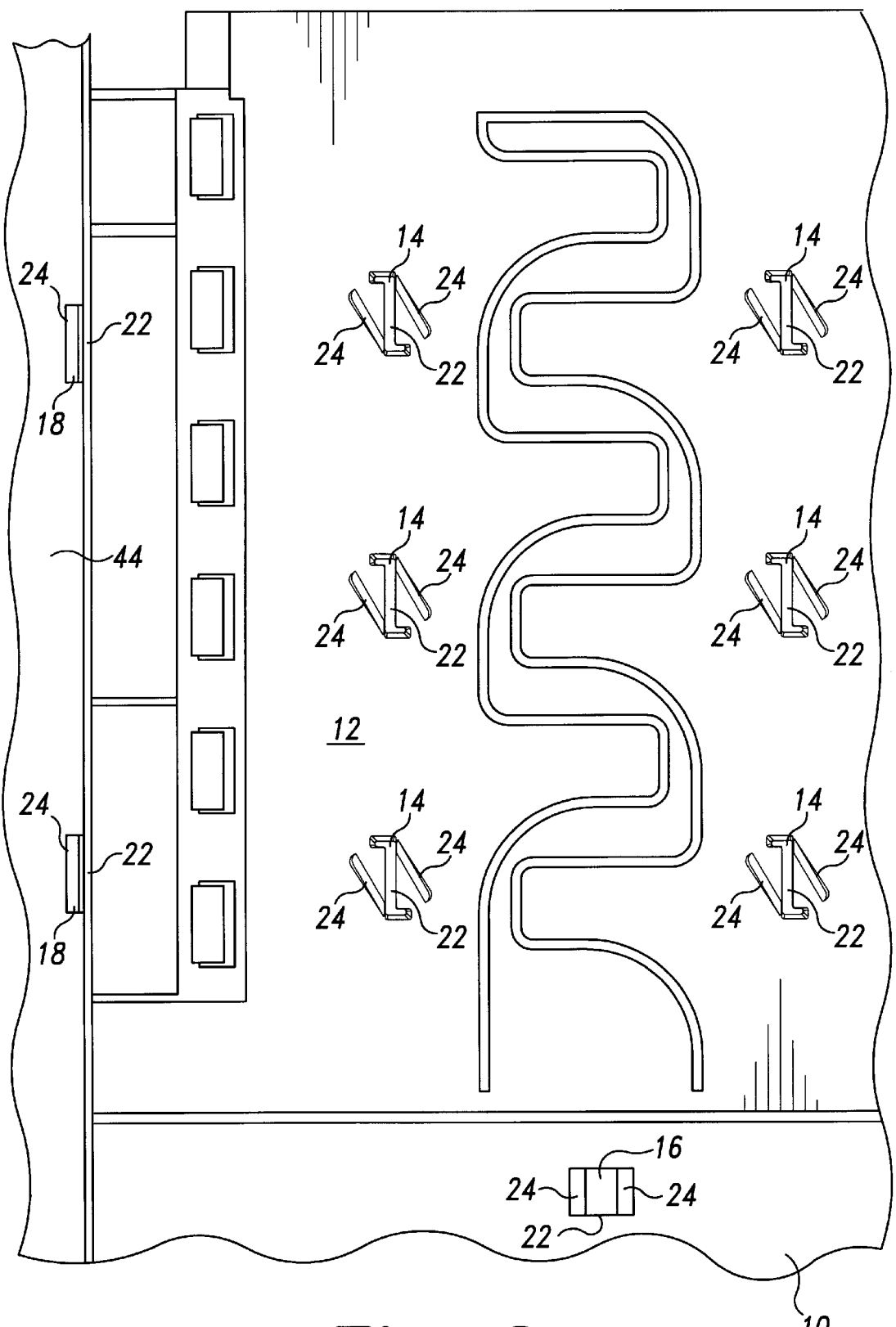
FIG. 2 is a plan view of the basepan shown in FIG. 1 with the heat staking posts shown in FIG. 1 replaced by fasteners of the present invention.
Figure 7:
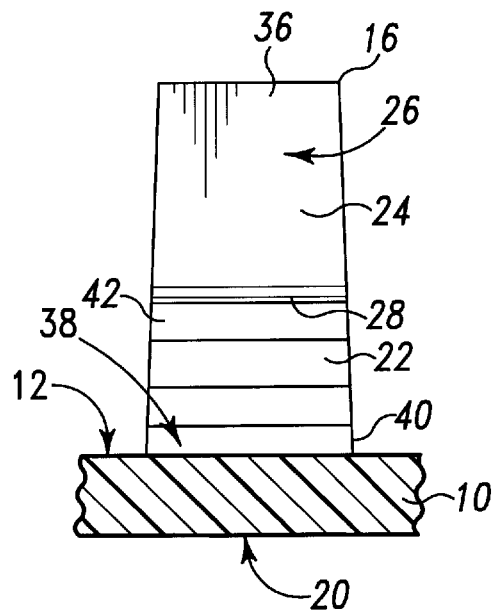
FIG. 7 is a side elevation view of a second form of fastener in accordance with the present invention.
Figure 8:
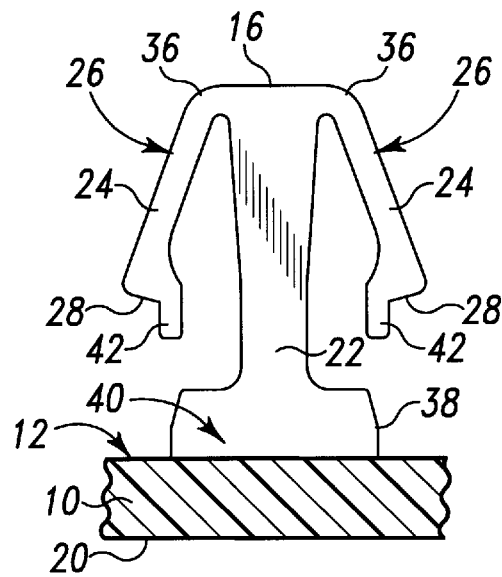
FIG. 8 is an end elevation view of the fastener shown in FIG. 7.
Figure 9:
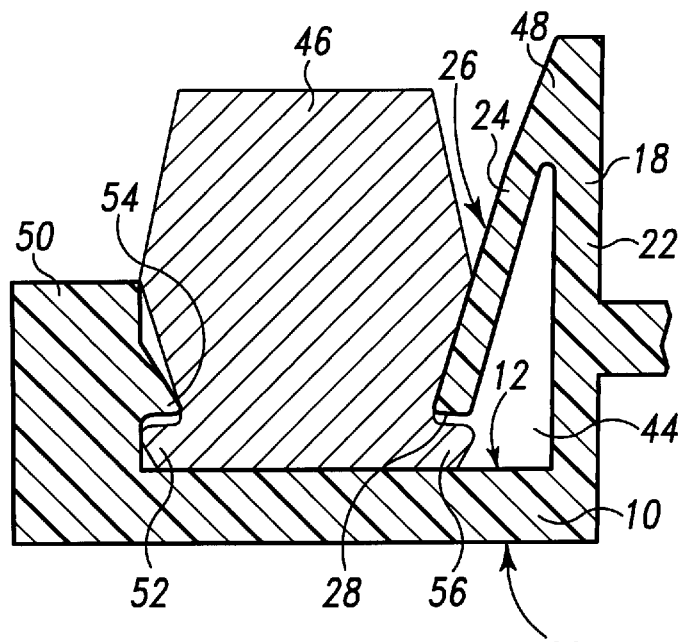
FIG. 9 is a sectional view of a third form of fastener in accordance with the present invention showing a retained neutral bar.

A basepan 10 of the present invention is shown in plan view in FIG. 2 to comprise a first surface 12 upon which the electrical components such as bus bars, neutral bars, and neutral tie bars are to be mounted. The first surface 12 includes a plurality of integrally formed fasteners 14, 16, and 18 intended to engage edges of at least one of the electrical bars to fix the bar to the basepan first surface 12. The integral fasteners 14 are shown in greater detail in FIGS. 3 through 6. The integral fasteners 16 are shown in greater detail in FIGS. 7 and 8, while integral fasteners 18 are shown in greater detail in the sectional view of FIG. 9.

Each of the fasteners 14, 16, and 18 is formed in the absence of any core through the basepan 10 from a second surface 20 obverse to the first surface 12 and is generally intended to engage an interior edge at a margin of an opening or aperture in a bar or other electrical component (not shown). Each integrally formed fastener 14, 16, and 18 has a support portion 22 which projects away from the basepan first surface 12 and a flexural portion 24 supported by the support portion 22. The flexural portion 24 has a first outwardly facing surface 26 inclined with respect to the basepan first surface 12 at an angle that facilitates elastic deformation of the flexural portion 24. The elastic deformation upon application of a bar to the basepan 10 is confined to the flexural portion 24 and does not include or extend to the support portion 22. The flexural portion 24 also has a second inwardly facing surface 28 arranged with respect to the basepan first surface 12 so that fixed retention of the bar is achieved despite any reasonable variation in the thickness of the bar to be secured by the integral fastener.

The flexural portions 24 of integral fasteners 14 include a lateral margin 30 integral with the support portion 22, with the first outwardly facing surface 26 being situated on the upper edge 32 of each flexural portion 24 as shown in FIGS. 3 through 6. The support portion 22 includes outer edges 34 sized to longitudinally and/or laterally locate the bus bar or other electrical component with respect to the basepan 10. The second inwardly facing surfaces 28 are inclined with respect to the basepan first surface 12 so that fixed retention of the bar is achieved despite any reasonable variation in the thickness of the bar to be secured by the integral fastener 14. In the illustrated embodiment, the two inwardly facing surfaces 28 are spaced from the basepan first surface 12 by differing amounts and are inclined at slightly different angles to further accommodate variations in thickness of the bar to be secured by the integral fastener 14. The two inwardly facing surfaces 28 are also preferably inclined, as best shown in FIG. 5, at a reverse angle of about 10° or more. Once a bar or other electrical component is secured by the integral fastene 14, any attempt to remove it causes a force tending to displace the flexural portions 24 outwardly, the force being provided by the reverse angle on the inwardly facing surfaces 28 interacting with the electrical component.

The flexural portions 24 of integral fasteners 16 include upper margins 36 integral with the support portion 22 with the first outwardly facing surfaces 26 dependent from upper margins 36. The support portion 22 includes outer edges 38 and 40 sized to longitudinally and/or laterally locate the bus bar or other electrical component wits respect to the basepan 10. Distal portions 42 extending downwardly from the second inwardly facing surfaces 28 which, in turn, are inclined with respect to the basepan first surface 12 so that fixed retention of the bar is assured. The absence of any core through structure in the basepan 10 in the vicinity of the integral fastener 16 insures electrical isolation from any bar or other electrical component facing the basepan surface 12 and assures greater structural integrity for the supporting portion 22 of the fastener 16.

The integral fasteners 18 are included periodically along the margin of channel 44 adapted to receive a component such as neutral bar 46. One edge of the channel 44 defines the support portion 22. The flexural portions 24 of integral fasteners 18 include discontinuous upper margins 48 integral with the continuous support portion 22 with the first outwardly facing surfaces 26 dependent from upper margins 48. A wall 50 of the channel 44 opposite the wall forming support portion 22 laterally locates the neutral bar 46 or other electrical component with respect to the basepan 10.

Installation of the neutral bar 46 within channel 44 is achieved by first engaging a first lower edge 52 of the neutral bar 46 under tang 54 of wall 50, and then, with a rotating motion, engaging the second lower edge 56 under the inwardly facing surface 28 through a flexural elastic displacement of the flexural portion 24. The second inwardly facing surfaces 28 are spaced from the basepan first surface 12 by a distance small enough to restrict the lateral displacement of the neutral bar within the channel 44 away from wall 50 so that fixed retention of the neutral bar 46 within the channel 44 is assured.

While the fasteners have been described in connection with the need to fix the positions of bus bars, neutral bars, neutral tie bars and other electrical components to an insulated basepan of an electric load center, it will be appreciated that the fasteners of the present invention can be employed in other apparatus and circumstances. Further, while the foregoing description and drawings represent preferred embodiments of the present invention, it will be apparent to those skilled in the art that various changes and modifications may be made therein without departing from the true spirit and scope of the present invention.

What is claimed is:

1. A basepan for mounting selected components in an electric load center, the basepan comprising:
 a basepan surface to which at least one selected component of the load center is to be mounted, the surface having at least one integrally formed fastener for engagement with the at least one selected component, the at least one integrally formed fastener having a support portion projecting away from the basepan surface and a flexural portion supported by and elastically deformable with respect to the support portion, the flexural portion including:
  a first outwardly facing surface inclined with respect to the basepan surface at a non-zero angle that facilitates elastic deformation of the fastener upon application of the at least one selected component to the basepan, and
  a second inwardly facing surface inclined with respect to the basepan surface at a non-zero angle that facilitates fixed retention of the at least one selected component despite any variation of thickness of the component.

2. The basepan according to claim 1 wherein the support portion includes an upper margin, said first outwardly facing surface being dependent from the upper margin of the support portion.

3. The basepan according to claim 1 wherein the support portion includes outer edges sized to locate the selected component with respect to the basepan.

4. The basepan according to claim 1 wherein the flexural portion includes a lateral margin integral with the support portion, the first outwardly facing surface being situated on the upper edge of the flexural portion.

5. The basepan according to claim 4 wherein the support portion includes outer edges sized to locate the selected component with respect to the basepan.

6. The basepan according to claim 1 wherein at least one integrally formed fastener includes a pair of said second inwardly facing surfaces that are dimensionally varied with respect to each other to enhance the likelihood of fixed retention of various electrical components to the basepan surface despite variations in thickness of the electrical components.

7. A basepan for mounting selected components in an electric load center, the basepan comprising:
 a basepan surface to which at least one selected component of the load center is to be mounted, the surface having at least one integrally formed fastener for engagement with the at least one selected component, the at least one integrally formed fastener having:
  a first outwardly facing surface inclined with respect to the basepan surface at an angle that facilitates elastic deformation of the fastener upon application of the at least one selected component to the basepan, and
  a pair of second inwardly facing surfaces dimensionally varied with respect to each other and inclined with respect to the basepan surface at an angle that facilitates fixed retention of the at least one selected component despite any variation of thickness of the component, the pair of second inwardly facing surfaces being spaced from the basepan surface by differing amounts.

8. A basepan for mounting selected components in an electric load center, the basepan comprising:
 a basepan surface to which at least one selected component of the load center is to be mounted, the surface having at least one integrally formed fastener for engagement with the at least one selected component, the at least one integrally formed fastener having:
  a first outwardly facing surface inclined with respect to the basepan surface at an angle that facilitates elastic deformation of the fastener upon application of the at least one selected component to the basepan, and
  a pair of second inwardly facing surfaces inclined with respect to the basepan surface at an angle that facilitates fixed retention of the at least one selected component despite any variation of thickness of the component wherein the dimensional variation comprises pair of second inwardly facing surfaces are inclined at different angles with respect to the basepan surface.

9. A basepan for mounting selected components in an electric load center, the basepan comprising:
 a basepan surface to which at least one selected component of the load center is to be mounted, the surface having at least one integrally formed fastener for engagement with the at least one selected component, the at least one integrally formed fastener having:
  a first outwardly facing surface inclined with respect to the basepan surface at an angle that facilitates elastic deformation of the fastener upon application of the at least one selected component to the basepan, and
  a second inwardly facing surface inclined at a reverse angle so that any attempt to remove a selected component from the basepan surface causes a force tending to displace the second inwardly facing surface toward additional engagement with the selected component.

10. A basepan for an electric load center comprising a surface upon which electrical bus bars are mounted, the surface including a plurality of integrally formed fasteners, each fastener to engage at least one of the electrical bus bars to fix the bus bar to the basepan surface, each fastener being formed in the absence of any core through the basepan and having a support portion projecting away from the basepan surface and a flexural portion supported by and elastically deformable with respect to the support portion, the flexural portion including:
 a first outwardly facing surface inclined with respect to the basepan surface at a non-zero angle that facilitates elastic deformation of the fastener upon application of one of the bus bars to the basepan, and
 a second inwardly facing surface inclined with respect to the basepan surface at a non-zero angle that facilitates fixed retention of the bus bar to the basepan surface despite any variation of thickness of the bus bar.

11. The basepan according to claim 10 wherein the support portion projecting away from the basepan surface includes at least a pair of lateral margins integral with the support portion and each flexural portion is integral with each one of the lateral margins, said first outwardly facing surface being situated on the upper edge of each flexural portion.

12. The basepan according to claim 11 wherein said second inwardly facing surfaces on each flexural portion are dimensionally varied with respect to each other to enhance the likelihood of fixed retention of the bus bar to the basepan surface despite variations in thickness of the bus bar.

13. A basepan for an electric load center comprising a surface upon which electrical bus bars are mounted, the surface including a plurality of integrally formed fasteners, each fastener to engage at least one of the electrical bus bars to fix the bus bar to the basepan surface, each fastener being formed in the absence of any core through the basepan and having:
   a first outwardly facing surface inclined with respect to the basepan surface at an angle that facilitates elastic deformation of the fastener upon application of one of the bus bars to the basepan, and
   a pair of second inwardly facing surfaces connected to a common support portion of one of the plurality of integrally formed fasteners includes a dimensional variation comprising two second inwardly facing surfaces that are spaced from the basepan surface by differing amounts and are inclined with respect to the basepan surface at an angle that facilitates fixed retention of the bus bar to the basepan surface despite any variation of thickness of the bus bar.

14. A basepan for an electric load center comprising a surface upon which electrical bus bars are mounted, the surface including a plurality of integrally formed fasteners, each fastener to engage at least one of the electrical bus bars to fix the bus bar to the basepan surface, each fastener being formed in the absence of any core through the basepan and having:
   a first outwardly facing surface inclined with respect to the basepan surface at an angle that facilitates elastic deformation of the fastener upon application of one of the bus bars to the basepan, and
   a pair of second inwardly facing surfaces connected to a common support portion of one of the plurality of integrally formed fasteners includes a dimensional variation comprising a pair of second inwardly facing surfaces that are inclined at different angles with respect to the basepan surface and at an angle that facilitates fixed retention of the bus bar to the basepan surface despite any variation of thickness of the bus bar.

15. The basepan according to claim 14 wherein the second inwardly facing surfaces are inclined at a reverse angle so that any attempt to remove the bus bar from the basepan surface causes a force tending to displace the flexural portions toward additional engagement with the bus bar.

16. A basepan for an electric load center comprising a surface upon which electrical bus bars are mounted, the surface including a plurality of integrally formed fasteners, each fastener to engage at least one of the electrical bus bars to fix the bus bar to the basepan surface, each fastener being formed in the absence of any core through the basepan and having:
   a first outwardly facing surface inclined with respect to the basepan surface at an angle that facilitates elastic deformation of the fastener upon application of one of the bus bars to the basepan,
   a second inwardly facing surface inclined with respect to the basepan surface at an angle that facilitates fixed retention of the bus bar to the basepan surface despite any variation of thickness of the bus bar, and
   at least one integrally formed fastener having a support portion projecting away from the basepan surface to a distal margin and a flexural portion depending from the distal margin including said first outwardly facing surface and said second inwardly facing surface for engaging an electrical component other than a bus bar.

17. The basepan according to claim 16 further comprising at least one channel adapted to receive said electrical component other than a bus bar, a top margin of one side of the channel forming said distal margin, and a plurality of flexural portions depending from said channel side top margin.

18. The basepan according to claim 17 further comprising a tang located on an opposite side of the channel confronting the plurality of flexural portions.

19. A fastener integrally formed on a first surface of a basepan for an electric load center without any core through from an opposite surface of the basepan, the fastener comprising:
   a support portion projecting away from the basepan first surface having an upper margin defining a top margin of one side of a channel, and a plurality of flexural portions supported by the support portion having:
      a first outwardly facing surface inclined with respect to the basepan surface at an angle that facilitates elastic deformation of the fastener upon application of an electrical component to the basepan,
      a second inwardly facing surface inclined with respect to the basepan surface at an angle that facilitates fixed retention of the electrical component despite any variation of thickness of the component, and
      an opposite side of the channel including a tang confronting the plurality of flexural portions.

* * * * *